United States Patent [19]

Izumi et al.

[11] Patent Number: 4,836,034
[45] Date of Patent: Jun. 6, 1989

[54] FORCE SENSING APPARATUS

[75] Inventors: Kohji Izumi; Hirotoshi Eguti; Eiichi Ohta; Yuhji Kimura; Yutaka Ebi, all of Yokohama, Japan

[73] Assignee: Ricoh Company, Ltd., Tokyo, Japan

[21] Appl. No.: 73,290

[22] Filed: Jul. 14, 1987

[30] Foreign Application Priority Data

| Jul. 15, 1986 | [JP] | Japan | 61-166391 |
| Jul. 15, 1986 | [JP] | Japan | 61-166392 |
| Sep. 18, 1986 | [JP] | Japan | 61-219968 |

[51] Int. Cl.⁴ .................... G01L 5/16; G01L 3/02
[52] U.S. Cl. .................... 73/862.04; 73/862.35; 73/862.32
[58] Field of Search .......... 73/794, 862.35, 862.33, 73/862.32, 862.65, 862.64, 862.62, 862.66, 862.04, 862.05, 862.06, 862.47, 862.48

[56] References Cited

U.S. PATENT DOCUMENTS

| 3,879,995 | 4/1975 | Libertiny | 73/862.04 |
| 3,985,025 | 10/1976 | Ormond | 73/862.65 |
| 4,186,596 | 2/1980 | Bohringer et al. | 73/862.35 |
| 4,448,083 | 5/1984 | Hayashi | 73/862.04 |
| 4,577,513 | 3/1986 | Harwood et al. | 73/862.04 |

FOREIGN PATENT DOCUMENTS 0079129  4/1986  Japan .................. 73/862.04

Primary Examiner—Stewart J. Levy
Assistant Examiner—Robert R. Raevis
Attorney, Agent, or Firm—Oblon, Fisher, Spivak, McClelland & Maier

[57] ABSTRACT

A force sensing apparatus comprising:
a plate-like strain producing body;
a central portion disposed integrally at a center of the body and having higher rigidity than the body;
a peripheral portion disposed integrally along a periphery of the body and having higher rigidity than the body; and
a plurality of sensing elements formed on a surface of the body and having an electric resistance variable in accordance with a deformation thereof in order to simultaneously sense mutually orthogonal X, Y and Z axial components of an external force applied to the body via the central portion or the peripheral portion, the sensing elements being on the same plane.

7 Claims, 11 Drawing Sheets (a)

(b)

(a)

(b)

(c)

(d)

(a)

(b)

(c)

(d)

FORCE SENSING APPARATUS

FIELD OF THE INVENTION

This invention relates to a force sensing apparatus used in three-dimensional input devices for example, robots and man-machine interfaces.

BACKGROUND OF THE INVENTION

A conventional force sensing apparatus includes a strain producing body which is elastically deformed when an external force is applied thereto and a plurality of sensing elements formed on the body and having an electric resistance changing in accordance with a deformation of the body. This apparatus takes out a change of the electric resistance as an electric signal of those sensing elements to sense the applied external force.

Generally, in a force sensing apparatus of this type, an external force acts on a point of action and can be decomposed into a number of components in accordance with the direction in which the external force acts.

There are several force sensing apparatuses which include a strain producing body of a cubic block structure which separately senses respective components of an external force applied thereto. These are disclosed in Laid-Open Utility Model Application Ser. Nos. 11903/1979 and 21021/1979, Laid-Open patent application Ser. Nos. 95433/1984, 57825/1986, 79129/1986, etc. Especially, these applications are characterized in that the force components Fx, Fy and Fz in the directions of X, Y and Z axes and the moment components Mx, My and Mz around the X, Y and Z axes of the external force are separately sensed by strain gauges attached on several surfaces to which the directions of the corresponding force components are perpendicular respectively. Thus the strain producing body cannot avoid taking the form of a three-dimensional structure as a block structure, as described above.

So long as such structure is concerned, means for manufacturing the strain producing body is limited to metal machining and/or electric discharge machining techniques. This means that it is necessary to manufacture the body from block-like workpiece, which is difficult and troublesome. Further, such strain gauges attached so as to sense the corresponding force components must be electrically connected in a bridge circuit, which means that the wiring is troublesome. Thus it is difficult to make them compact and reduce the manufacturing cost, and productivity is low accordingly.

Another example is a cubic block of combined plates, etc., to separately sense the respective external force components, as disclosed in Laid-Open patent application Ser. No. 83929/1986. A problem in this structure is that reproductivity is low because the sensing surfaces for the respective force components are fastened by screws, etc., which is likely to cause a hysteresis or non-linearity due to a deformation of the fastened surface portions.

OBJECTS OF THE INVENTION

It is a first object of this invention to provide a force sensing apparatus in which the strain producing body is easy to manufacture and the sensing elements are also easy to manufacture.

It is a second object of this invention to provide a force sensing apparatus in which the strain producing body and the sensing elements are easy to manufacture and interferences in respective force components of the applied force are very small.

SUMMARY OF THE INVENTION

The first object of this invention is achieved by a force sensing apparatus comprising:
a plate-like strain producing body;
a central portion disposed integrally at a center of the body and having higher rigidity than the body;
a peripheral portion disposed integrally along a periphery of the body and having higher rigidity than the body; and
a plurality of sensing elements formed on a surface of the body and having an electric resistance variable in accordance with a deformation thereof in order to simultaneously sense mutually orthogonal X, Y and Z axial components of an external force applied to the body via the central portion or the peripheral portion, the sensing elements being on the same plane.

The second object of this invention is achieved by a force sensing apparatus comprising:
a plate-like strain producing body;
a central portion disposed integrally at a center of the body and having higher rigidity than the body;
a peripheral portion disposed integrally along a periphery of the body and having higher rigidity than the body;
a plurality of sensing elements formed on a surface of the body and having an electric resistance variable in accordance with a deformation thereof in order to simultaneously sense mutually orthogonal X, Y and Z axial components of an external force applied to the body via the central portion or the peripheral portion; and
a plurality of holes provided along a circumference of a circle between the central portion and the peripheral portion, the sensing elements being on the same plane.

According to this invention, as described above, a flat plate-like strain producing body is provided in which either the central portion or the peripheral portion thereof is used support portion and the other as a portion is used for action. A sensing surface is formed between the central portion and the peripheral portion, both of which have a higher rigidity than that of the sensing surface. Sensing elements are formed on the sensing surface of the strain producing body and exhibit an electric resistance variable in accordance with a mechanical change in the sensing surface. Therefore, a first effect is that the flat plate-like strain producing body is very easy to manufacture using a manufacturing method such as press working of fine blanking or casting, which cannot be used on a block-like workpiece in the prior art. Sensing elements can be formed from a thin semiconductor film, so that sensing elements having equal characteristic can be arranged at exact positions. Especially, wiring of complex leads for a bridge circuit is easy.

A second effect is that, when the sensing surface is deformed, the holes disposed in the sensing surface intercept a circumferential bending stress to reduce interference between the respective components to thereby provide force sensing with high reliable accuracy.

BRIEF DESCRIPTION OF THE DRAWINGS

A force sensing apparatus of this invention will be described by referring to FIG. 1 to FIG. 20.

DETAILED DESCRIPTION OF THE PRESENTLY PREFERRED EMBODIMENTS

The First Embodiment

Figure 1:
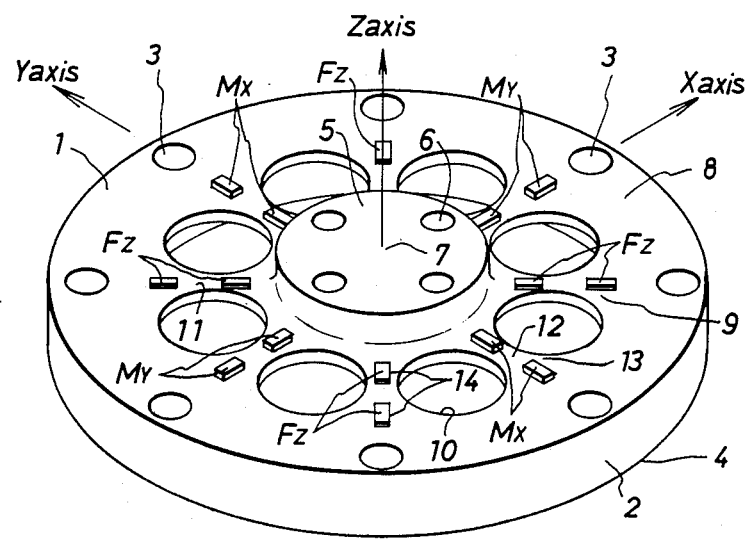
FIG. 1 is a perspective view of a first embodiment of this invention.

A first embodiment of this invention will now be described with reference to FIGS. 1 to 14. A flat plate-like strain producing body 1 includes an annular thick peripheral portion 2 having high rigidity and also having eight mounting holes 3 arranged along the circumference of the same circle and extending through the thickness of the body 1. The peripheral portion 2 is connected to a support 4 which is fixed to a fixture, not shown.

The body 1 has a thick disc-like central portion 5 which has four mounting holes 6 extending through the thickness thereof and which is attached to a member, not shown. The central portion 5 is used as a portion of action 7 on which an external force acts.

A thin flat plate portion 8 is formed between the peripheral portion 2 and the portion of action 7, and a surface of the plate portion 8 is used as a sensing surface 9. The plate portion 8 has eight relatively large holes 10 arranged at equal intervals which define eight radial arms 11 which connect the peripheral portion 2 and the central portion 5. Each arm 11 includes the narrowest central portion 12 and two expanding portions 13 in the form of a substantial trapezoid, being at each end of the central portion 12 respectively.

Figure 2:
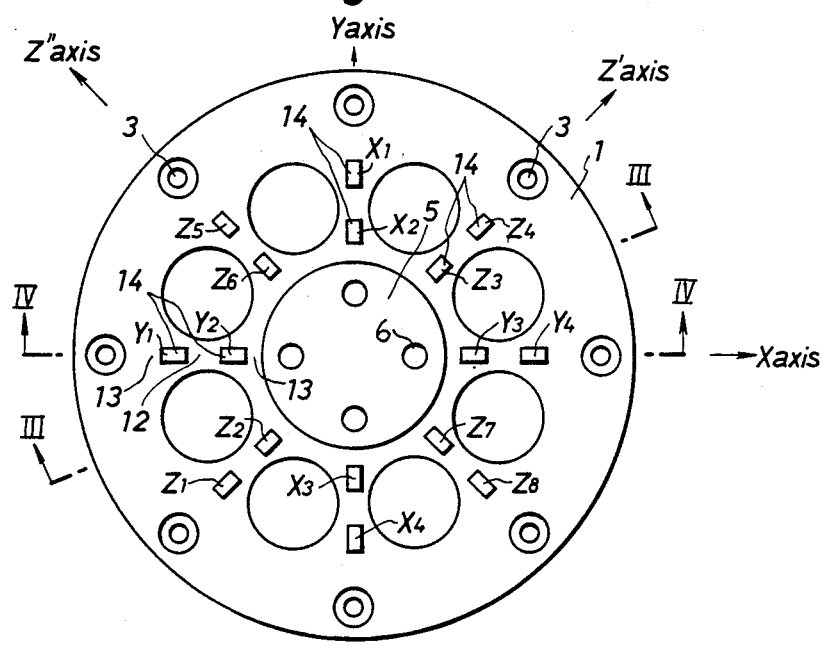
FIG. 2 is a plan view of the embodiment.
Figure 3:
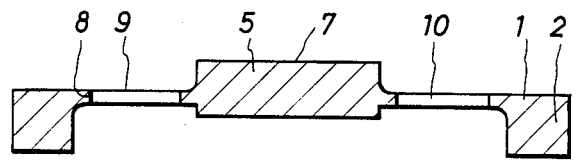
FIG. 3 is a cross-sectional view taken along the line III—III of FIG. 2.
Figure 4:
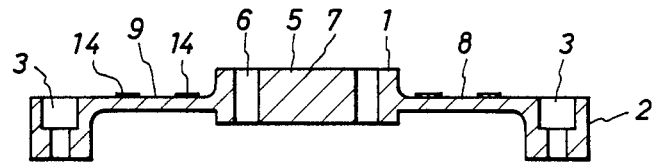
FIG. 4 is a cross-sectional view taken along the line IV—IV of FIG. 2.
Figure 5:
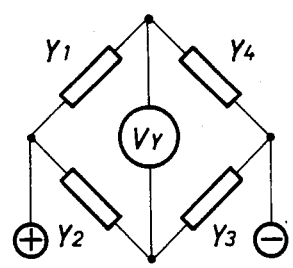
FIG. 5 is an electric circuit diagram showing a bridge circuit for sensing a moment component My.

As shown in FIG. 2, sensing elements 14 of strain gauges labelled Y1, Y2, Y3 and Y4 are formed on the X axis on the expanding portion 13. Sensing elements Y1, Y4 are positioned on the outer expanding portion 13, while sensing elements Y2, Y3 are positioned on the inner expanding portion 13. These sensing elements 14 are connected to form a bridge circuit as shown in FIG. 5 so that, when the balance among Y1, Y2, Y3 and Y4 is lost, an output Vy will be produced.

Figure 6:
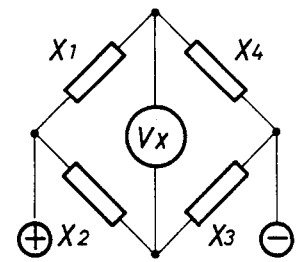
FIG. 6 is an electric circuit diagram showing a bridge circuit for sensing a moment component Mx.

Sensing elements 14 of strain gauges labelled X1, X2, X3 and X4 are formed on the Y axis orthogonal to the X axis on the expanding portion 13. Sensing elements X1, X4 are positioned on the outer expanding portion 13, while sensing elements X2, X3 are positioned on the inner expanding portion 13. These sensing elements 14 are connected to form a bridge circuit as shown in FIG. 6 so that, when the balance among X1, X2, X3 and X4 is lost, an output Vx will be produced.

Figure 7:
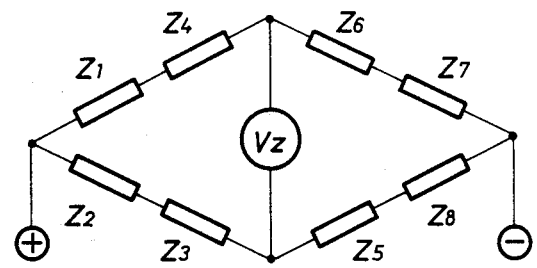
FIG. 7 is an electric circuit diagram showing a bridge circuit for sensing a force component Fz.

Eight sensing elements 14 labelled Z1, Z2, Z3, Z4, Z5, Z6, Z7, Z8 of strain gauges are formed on the expanding portions 13, in order that Z1, Z2, Z3, Z4 are disposed on the Z′ axis and Z5, Z6, Z7, Z8 are disposed on the Z″ axis, the Z′ and Z″ axes being at 45° to the X and Y axes. Z1, Z4, Z5, Z8 are positioned on the outer expanding portion 13 while Z2, Z3, Z6, Z7 are positioned on the inner expanding portion 13. These elements 14 are connected as shown in FIG. 7, namely, pairs Z1, Z4; Z2, Z3; Z5, Z8; and Z6, Z7 are connected to form a bridge circuit so that when the balance among these pairs is lost, an output Vz will be produced.

The sensing elements 14 positioned as described above may be of a conventional strain gauge of a metal foil, but, in this embodiment, they are formed by a thin film technique. The plate-like strain producing body 1 is made of an aluminum alloy or stainless steel. The sensing surface 9 has a buffer layer deposited thereon. Specifically, the buffer layer is of an $Si_3N_4$ or a virtually internal stress-free SiOx film having a thickness of from 2000 Å to 10000 Å formed by plasma CVD (chemical vapour deposition). A thin semiconductor film having a thickness of from 5000 Å to 20000 Å is then superposed on the buffer layer, and a high conductive material for an electrode material (for example, a thin metal film of Al, Ni-Cr, or Mo) having a thickness of from 2000 Å to 5000 Å is further superposed. Specifically, the thin semiconductor film made of μc-Si (microcrystal silicon) or n+ a-Si (amorphous silicon) formed by plasma CVD or optical excitation CVD, and the electrode is made of Al-Si (Si:2-3 % by weight) formed by vapour deposition or sputtering.

The electrode material is then patterned into a predetermined format by photolithography or etching. For etching, either a wet process or a dry process may be used. However, in order to avoid an influence on the characteristic of the elements, dry etching is more preferable. When the thin semiconductor film is made of n+ a-Si:H, and a mixture gas of $CF_4$—$O_2$ (3-20% by weight) is used in the plasma etching device, good etching will be possible with high reproductivity and high accuracy.

The wiring density is high because of bridge circuits of sensing elements 14 needed for sensing Fx, Fy, Fz, Mx, My and Mz components, which requires multilayered wiring, in which an inter-layer insulating material (for example, of photosensitive polyimide or $Si_3N_4$) is superposed. When photosensitive polyimide is to be used, it is coated by a roll coater or a spinner, and contact holes are formed by photolithography or etching. When $Si_3N_4$ is to be used, the inter-layer film is formed by plasma CVD, and then resist is coated and contact holes are formed by photolithography or etching.

A second electrode material (for example, of Al, Ni-Cr or Mo) is further superposed on that insulating material, and predetermined wiring and pads are formed by photolithography or etching.

In order to improve the damp-proofness and prevent possible damage, a passivation film (for example, of parylene or $SiO_2$, $Si_3N_4$) is superposed.

The first electrode pattern, inter-layer insulating material, and second electrode pattern may be formed earlier. In this case, removing defective articles manufactured up to this process would improve the yield in the final process. In the total defectiveness of sensing elements 14 shortcircuits and disconnections between the first and the second electrode patterns form 25% and shortcircuits due to bad insulation in the interlayer insulating material and disconnections due to bad contact holes form 20%. These defects up to this process occupy the majority of the defects as mentioned above. Therefore, it brings about a big effect to remove these defects at an early process.

When a thin semiconductor film is superposed, a metal mask having necessary openings therein may be used to form thin semiconductor films only at the predetermined positions. This elminates the photolithographic and etching processes onto the thin semiconductor film, thereby simplifying the processes and reducing the cost in manufacturing the sensing elements 14.

Figure 8:
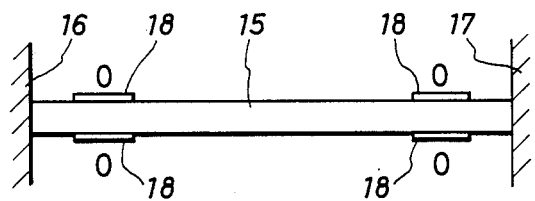
FIGS. 8(a) and (b) are side views showing the principles of the sensing.
Figure 8:
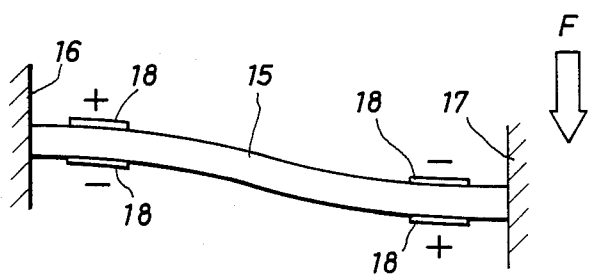

The sensing principles of the plate-like strain producing body 1 having the above-mentioned constitution will be described with reference to FIGS. 8(a), (b). First, in FIG. 8, a strain producing body 15 comprising a beam or a plate is mounted between a fixed member 16 and a movable member 17. Sensing elements of strain gauges 18 are disposed on the upper and lower surfaces of the body 15 at an equal distance from the center of the body 15. FIG. 8(a) shows the state in which no load is applied to the movable member 17, and FIG. 8(b) shows the state in which a downward load F is applied to the movable portion 17 to move the same downwardly. At this time, body 15 is extended at its upper surface and contracted at its lower surface near the fixed member 16, while it is contracted at its upper surface and extended at its lower surface near the movable member 17. Thus strains having opposite signs ± and the same absolute value occur on the corresponding strain gauges 18, and hence the resistances of the strain gauges 18 vary accordingly. Generally, these four strain gauges 18 are connected to form a bridge circuit which produces an output four times as high as that of a single strain gauge.

Figure 9:
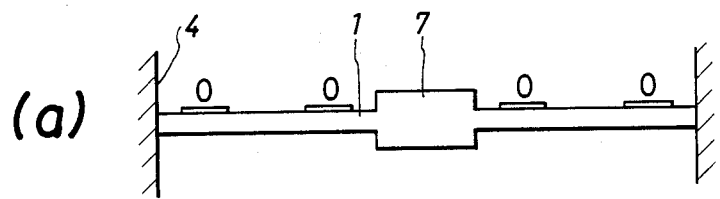
FIGS. 9(a), (b), and (c) are side views showing the principles of sensing when an external force is applied to the flat plate strain producing body.
Figure 9:
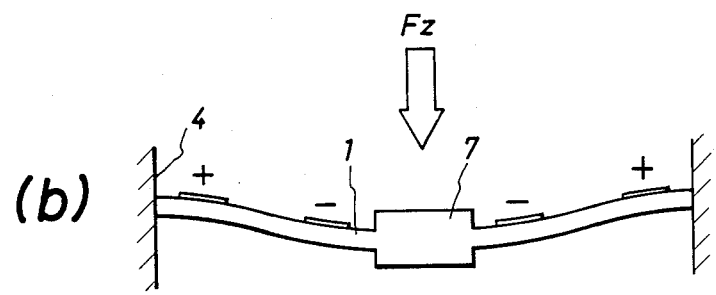
Figure 9:
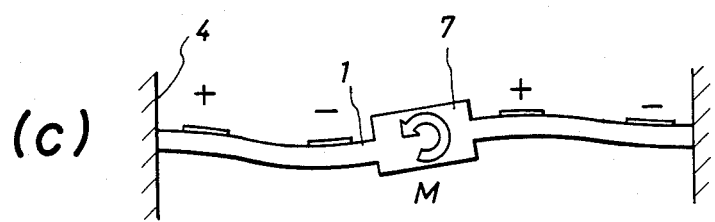

FIG. 9 shows a plate-like strain producing body 1 similar in cross section to body 1 in this embodiment. The peripheral support 4 is fixed to a fixture, not shown, and an external force is to act on the central portion of action 7. FIG. 9(a) shows the state in which no load acts on the portion of action 7, while FIG. 9(b) shows the state in which a vertical load Fz acts on the central portion 7. Under this condition, one side of FIG. 9(b) is similar to FIG. 8(b) wherein two inner sensing elements 14 are contracted (−) while two outer sensing elements 14 are extended (+). FIG. 9(c) shows the state in which a moment M acts on the portion of action 7. Under this condition, inner and outer sensing elements 14 show opposite signs.

In this plate-like strain producing body 1 with such principles, since the support 4 and the portion of action 7 have large thickness compared to that of the flat plate portion 8, and since they are formed integrally, the support 4 and the portion of action 7 have higher rigidity compared to that of the flat plate portion 8. Therefore, only the flat plate portion 8 is strained when the portion of action 7 receives force to be sensed, which makes measuring accuracy better. A stress (due to tightening of screws or the like) is likely to occur in the support 4 and the portion of action 7, which produces a strain in the sensing surface 9. However, according to this invention, the support 4 and the portion of action 7 have sufficient rigidity so that no strain due to the tightening will be produced on the sensing elements 14.

Generally, a pressure receiving member projecting in the Z axial direction is attached to the central portion of action 7. If a force Fx is applied to an end of the pressure receiving member, a moment My will be produced at the portion of action 7, while, if a force Fy is applied to the end of the pressure receiving member, a moment Mx will be produced at the portion of action 7. Therefore My, Mx and Fz are three representative components.

Figure 10:
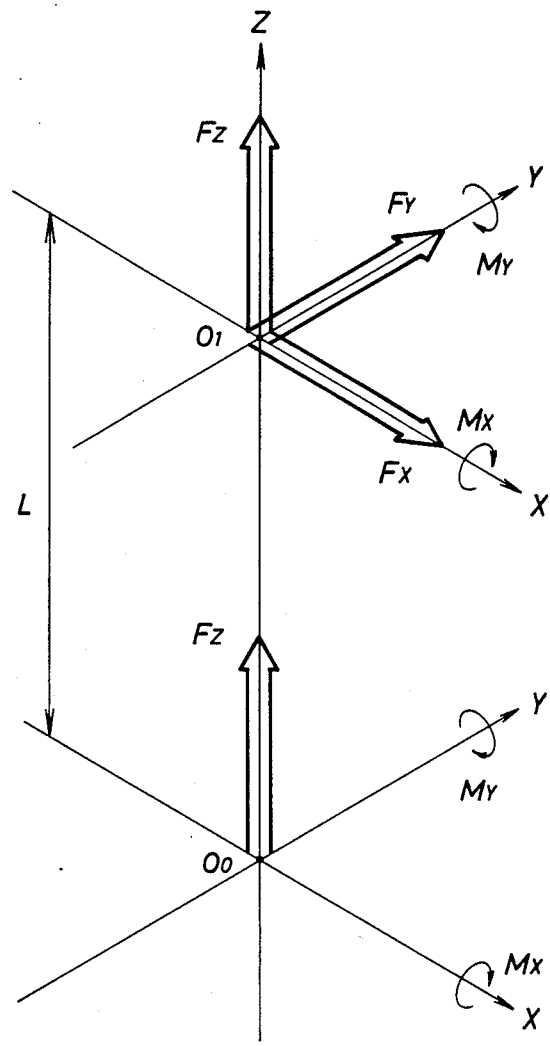
FIG. 10 is a perspective view, showing directions of components of a force.

The relationship among the components will be described with reference to FIG. 10. First assume that there is a point of action 00 at the center of the sensing surface 9 on which a pressure receiving member having a height L is attached and that an external force acts on a point of action 01 of the pressure receiving member. The components Fx, Fy, Fz, Mx, My which act on the point of action 01 of the pressure receiving member are converted into components Fz, Mx, My on the point of action 00 of the sensing surface 9.

Figure 11:
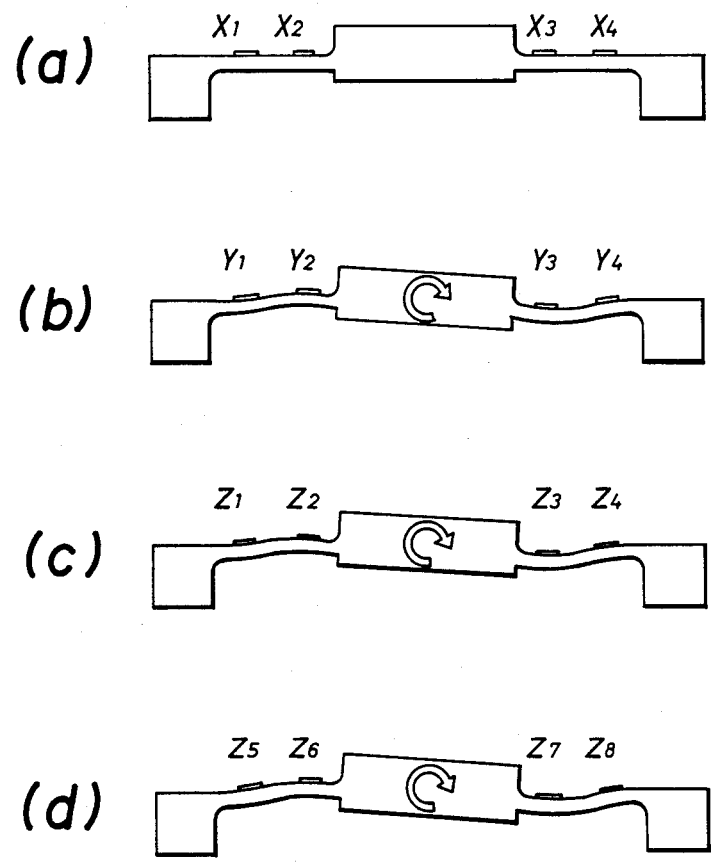
FIGS. 11(a), (b), (c) and (d) are side views of the plate-like body deformed by a moment My exerted thereon.
Figure 12:
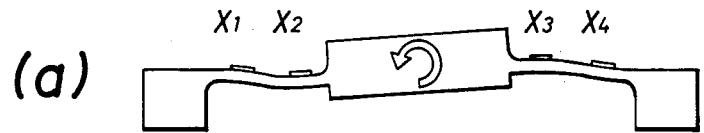
FIGS. 12(a), (b), (c) and (d) are side views of the plate-like body deformed by a moment Mx exerted thereon.
Figure 12:
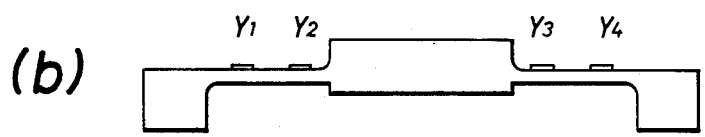
Figure 12:
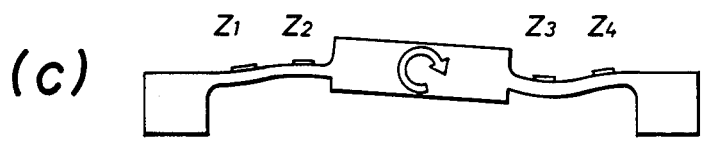
Figure 12:
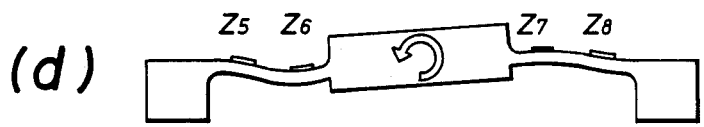

A typical state in which an external force acts on the strain producing body 1 will be described with reference to FIGS. 11–13. First, FIG. 11(a), (b), (c), (d) show the state in which a moment My only acts on the portion of action 7. Under this condition, as shown in FIG. 11(a), there is no change in the Mx component sensing portion, and the bridge circuit composed of sensing elements 14 labelled X1, X2, X3, X4, as shown in FIG. 6, provides a null output Vx. The My component sensing portion is in a mode shown in FIG. 11(b) where the respective sensing elements 14 labelled Y1, Y2, Y3, Y4 are deformed, and the bridge circuit shown in FIG. 5 provides an output Vy corresponding to the moment My. The Fz component sensing portion is in a mode shown in FIG. 11(c), (d) in which eight sensing elements 14 labelled Z1, Z2, Z3, Z4, Z5, Z6, Z7, Z8 are deformed. The extent to which the respective sensor elements are deformed is small, and the output of the bridge circuit shown in FIG. 7 is virtually null. Namely, each of pairs Z1, Z4; Z2, Z3; Z5, Z8; Z6, Z7 provides opposite extensions and contractions and the resultant resistances of the respective arms of the bridge circuit of FIG. 7 are cancelled to zero to thereby provide a null output Vz.

Although eight strain gauges are used for sensing the Fz component, four strain gauges may be used which are formed on either one of axes at angles of 45° to the X and Y axes. However, in order to reduce interference by forces (moments) except for the Fz component, the 8-strain gauge system is preferable used.

The state in which only moment Mx acts is shown in FIG. 12(a), (b), (c), (d) in which the Mx component sensing portion produces output Vx while the My component sensing portion outputs a null output Vy. The output Vz of the Fz component sensing portion becomes null for a reason similar to that in FIG. 11(c), (d), as mentioned above.

Figure 13:
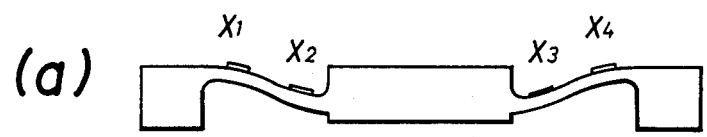
FIGS. 13(a), (b), (c) and (d) are side views of the plate-like body deformed by a force Fz exerted thereon.
Figure 13:
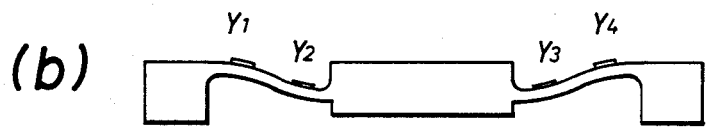
Figure 13:
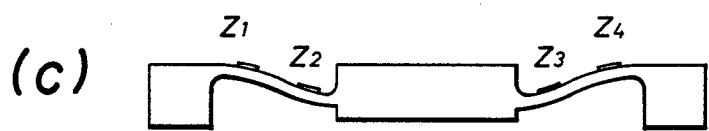
Figure 13:
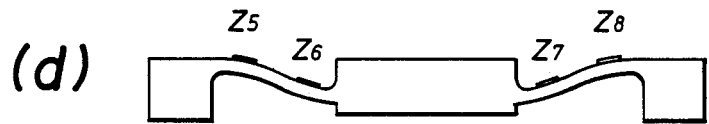
Figure 14:
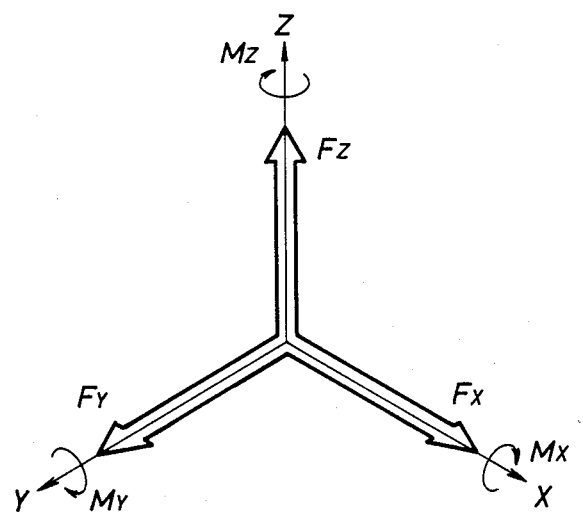
FIG. 14 is a vector diagram showing the respective components of an external force exerted on the body.

The state in which only a force Fz acts is shown in FIG. 13(a), (b), (c), (d). In the Mx component sensing portion X1, X4 exhibit deformations of extension (+) while X2, X3 exhibit deformations of contraction (−), so that the bridge circuit of FIG. 6 produces a null output Vx. By the similar reason, the My component sensing portion produces a null output Vy. On the other hand, the Fz component sensing portion produces an output Vz four times as high as that of single sensor element 14. These outputs of respective component sensing portions shown in FIGS. 11-13 are collected as shown in Table 1 below.

TABLE 1

| | | My | Mx | Mz |
|---|---|---|---|---|
| Mx component sensing portion | X1 | 0 | + | + |
| | X2 | 0 | − | − |
| | X3 | 0 | + | − |
| | X4 | 0 | − | + |
| | Vx | 0 | Vx | 0 |
| My component sensing portion | Y1 | − | 0 | + |
| | Y2 | + | 0 | − |
| | Y3 | − | 0 | − |
| | Y4 | + | 0 | + |
| | Vy | Vy | 0 | 0 |
| Fz component sensing portion | Z1 | − | − | + |
| | Z2 | + | + | − |
| | Z3 | − | − | − |
| | Z4 | + | + | + |
| | Z5 | − | + | + |
| | Z6 | + | − | − |
| | Z7 | − | + | − |
| | Z8 | + | − | + |
| | Vz | 0 | 0 | Vz |

As described above, it becomes possible to amplify the signals to be sensed of the sensing elements 14 and to nullify other interferential signals by the bridge circuit.

Since the large holes 10 are formed in the plate portion 8 of the strain producing body, the respective components are well separated. If the plate portion 8 should have no holes 10 and be formed by a circular diaphragm, a bending stress would be produced circumferentially as well as radially with substantially equal magnitudes in the plate portion 8 when an external force acts on the portion of action 7. The circumferential stress would greatly interfere with the other components when the same components are to be sensed. Since, as described above, a plurality of holes 10 are formed at equal intervals along the circumference of a circle as described above, however, the circumferential bending stress produced in the plate portion 8 is reduced so that a strain will appear mainly radially.

The arms 11 are defined by the holes 10 formed in the plate portion 8 of the strain producing body 1, and the sensing elements 14 are positioned at the corresponding expanding portions 13 of the arms 11. Each expanding portion 13 is defined by adjacent holes 10 and takes the form of a substantial trapezoid. Each expanding portion 13 is separated by a hole 10 from each adjacent expanding portion 13, and it consequently does not invite interference by a circumferential bending stress, as described above. Since each expanding portion 13 is positioned at the base portion of an arm 11 where a radial bending stress is easy to occur, it is proper to form the sensing elements 14 on the expanding portion 13 for sensing a strain due to the applied external force. The distribution of bending stresses occurring at the expanding portion 13 is relatively uniform and causes no interference. Therefore, when the sensing elements 14 are attached as a strain gauge to the strain producing body 1, there is no deterioration in the precision of the sensing, although the sensing elements are slightly deviated from their target positions. Thus slight deviation in position can be tolerated, and no severe conditions are required for the accuracy in positions where the sensing elements 14 are attached.

Provision for eight holes in the plate portion 8 of the strain producing body 1 allows the sensing elements 14 labelled Z1, Z2, Z3, Z4, Z5, Z6, Z7, Z8 to be disposed on the Z′ and Z″ axes, respectively at 45° to the X and Y axes. Such arrangement of the sensing elements 14 allows the Fz component to be sensed well as shown in the Table.

The number of the holes 10 may be a multiple of 8. It is not necessarily required to dispose the sensing elements 14 on the axes at angles of 45° to the X and Y axes. The sensing elements 14 may be disposed at other desired angles. But if the number of holes 10 is a multiple of 8, the sensing elements 14 can be disposed symmetrically along the circumference of a circle so that variations of the resistances of the sensing elements are counterbalanced.

The Second Embodiment

Figure 15:
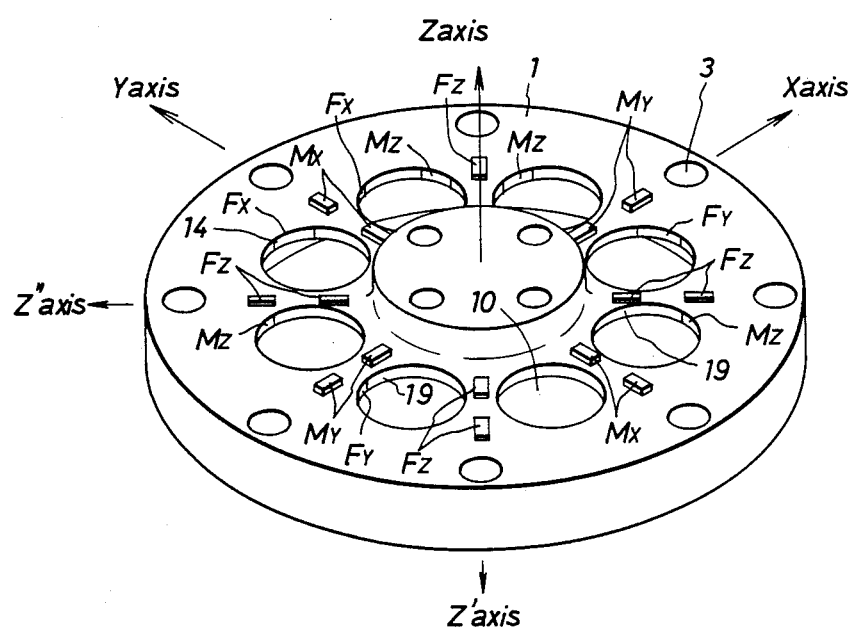
FIG. 15 is a perspective view of a second embodiment of this invention.

A second embodiment of this invention will be described with reference to FIG. 15. This embodiment is the same in structure as the first embodiment except for the sensing elements 14 being attached to the corresponding inner peripheries 19 of holes 10 in strain producing body 1. The Fy sensing elements 14 are attached to the inner periphery 19 of each arm 11 along the X axis, the Fx sensing elements 14 are attached to the inner periphery 19 of each arm 11 along the Y axis, and the moment Mz sensing elements 14 are attached to the inner periphery 19 of each arm 11 along the Z axis at angles of 45° to the X and Y axes. Therefore, according to this embodiment, the moment Mz around the Z axis can be also sensed.

The Third Embodiment

Figure 16:
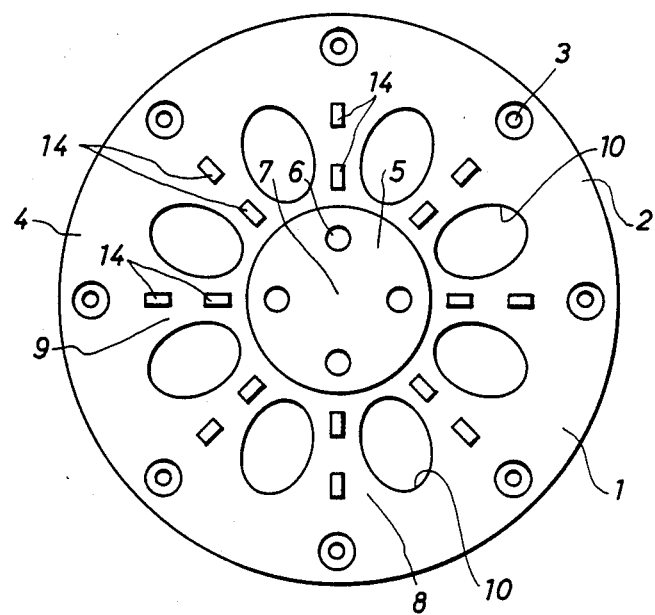
FIG. 16 is a plan view of a third embodiment of this invention.

FIG. 16 shows a third embodiment of this invention in which the holes 10 are oval with the longer diameter being oriented radially.

Figure 17:
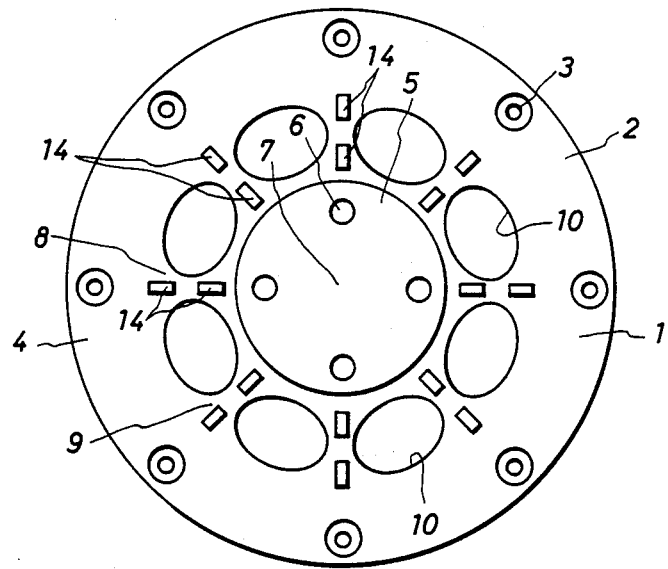
FIG. 17 is a plan view of a modification.

FIG. 17 shows a modification of the third embodiment in which oval holes 10 are oriented differently from those in FIG. 16; the holes are disposed so that their shorter diameters are oriented radially.

Figure 18:
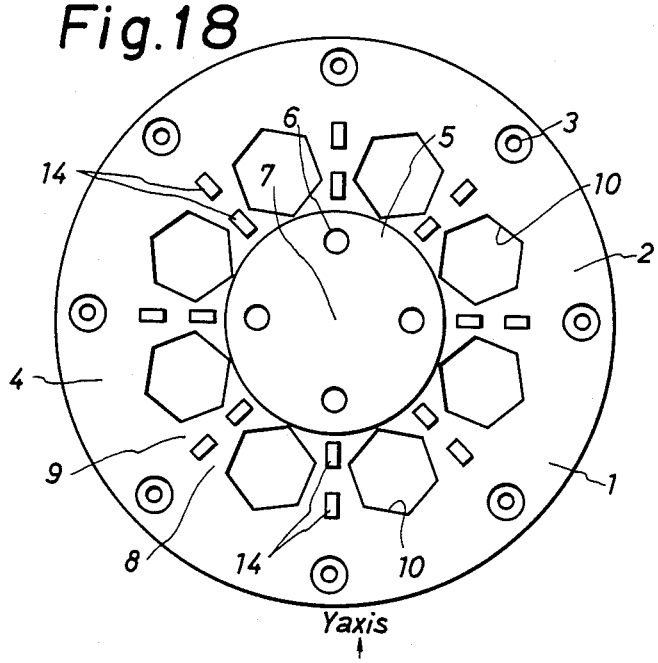
FIG. 18 is a plan view of a further modification.

FIG. 18 shows a further modification of the third embodiment in which the holes 10 are hexagonal. From the foregoing, it will be seen that the shape of the holes 10 may be optional.

The Fourth Embodiment

Figure 19:
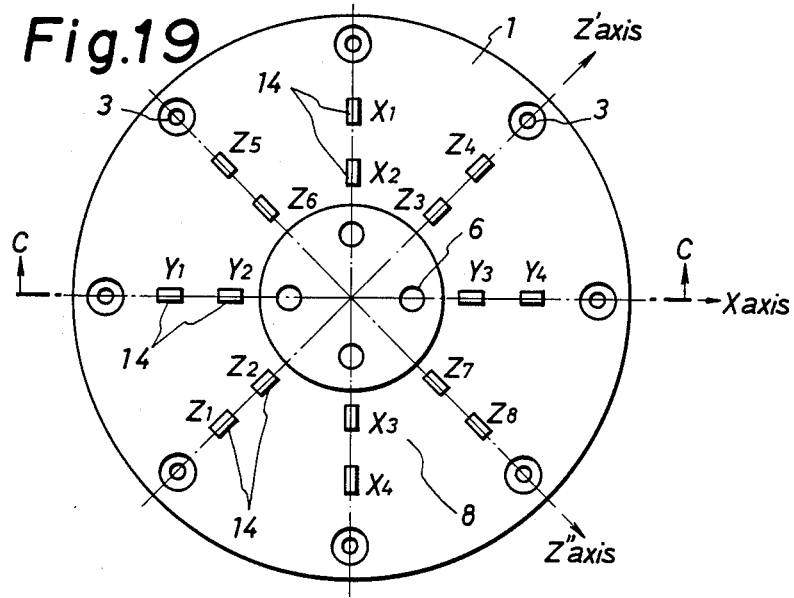
FIG. 19 is a perspective view of a fourth embodiment of this invention.
Figure 20:
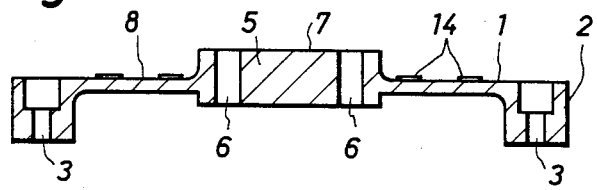
FIG. 20 is a cross-sectional view taken along the line C—C in FIG. 19.

A fourth embodiment of this invention will now be described with reference to FIGS. 19 and 20. In this embodiment, no holes 10 are formed in the plate portion 8 of the strain producing body 1, the sensing elements 14 are arranged on the orthogonal X and Y axes for sensing My and Mx, respectively, and also on Z′ and Z″ axes at angles of 45° to the X and Y axes for sensing Fz.

While in the above respective embodiments, the plate-like strain producing body 1 has been described as being a disc, the shape of the body is not limited to a disc, but may be square, rectangular, polygonal or of any other optional shape.

While the above embodiments have been described as sensing all the components in the three directions X, Y and Z axes, the sensing apparatus may be constructed so as to sense the components in only two directions--for example, on the X and Y axes.

What is claimed is:

1. A force sensing apparatus comprising:
   (a) a plate-like body, said plate-like body comprising:
      (i) a central portion disposed integrally at the center of said plate-like body and having a first rigidity;
      (ii) a thin flat plate portion disposed integrally around said central portion and having a second rigidity lower than the first rigidity; and
      (iii) a peripheral portion disposed integrally along the periphery of said platelike body and having a third rigidity higher than the second rigidity;
   (b) a plurality of sensing elements formed on a planar surface of said plate-like body and having an electric resistance variable in accordance with a deformation thereof in order to simultaneously sense mutually orthogonal X, Y, and Z axial components of an external force applied to said plate-like body via said central portion or said peripheral portion; and
   (c) a plurality of holes provided along a circumference of a circle located on said thin flat plate portion, the number of said holes being 8 or a multiple of 8,
   wherein:
   (d) each one of said plurality of sensing elements is formed on an expanding portion of said plate-like body defined by two adjacent holes and in which, during use of said force sensing apparatus, the distribution of stresses is uniform.

2. A force sensing apparatus of claim 1 wherein:
   (a) said plate-like body is made of an aluminum alloy or stainless steel and
   (b) each one of said plurality of sensing elements is made of a thin semiconductor film.

3. A force sensing apparatus comprising:
   (a) a plate-like body, said plate-like body comprising:
      (i) a central portion disposed integrally at the center of said plate-like body and having a first rigidity;
      (ii) a thin flat plate portion disposed integrally around said central portion and having a second rigidity lower than the first rigidity; and
      (iii) a peripheral portion disposed integrally along the periphery of said plate-like body and having a third rigidity higher than the second rigidity;
   (b) a plurality of first sensing elements provided on an X axis on said plate-like body and having electric resistances variable in accordance with deformation thereof for sensing a moment around a Y axis on said platelike body orthogonal to the X axis on said platelike body;
   (c) a plurality of second sensing elements provided on the Y axis having electric resistances variable in accordance with deformation thereof for sensing a moment around the X axis; and
   (d) a plurality of third sensing elements provided on a Z′ and a Z″ axes on said plate-like body in the plane defined by the X and Y axes at angles of 45° to the X and Y axes, respectively, for sensing a force in the direction of a Z axis perpendicular to the surface of said plate-like body,
   (e) said plurality of first, second, and third sensing elements being co-planar.

4. A force sensing apparatus of claim 3, wherein a plurality of holes are provided along a circumference of a circle located on said thin flat plate portion.

5. A force sensing apparatus of claim 4, wherein the number of holes is 8 or a multiple of 8.

6. A force sensing apparatus of claim 5, wherein each of said plurality of first, second, and third sensing elements is formed on an expanding portion of said plate-like body defined by two adjacent holes and in which, during use of said force sensing apparatus, the distribution of stresses is uniform.

7. A force sensing apparatus of any one of claims 1 to 6 wherein:
   (a) said plate-like body is made of an aluminum alloy or stainless steel and
   (b) each of said plurality of first, second, and third sensing elements is made of a thin semiconductor film.

* * * * *

UNITED STATES PATENT AND TRADEMARK OFFICE
CERTIFICATE OF CORRECTION

PATENT NO. : 4,836,034

DATED : June 06, 1989

INVENTOR(S) : IZUMI, Kouji, et al

It is certified that error appears in the above-identified patent and that said Letters Patent is hereby corrected as shown below:

On the Title Page, item [75], the first inventor's name is incorrect, it should read as follows:

--KOUJI IZUMI--

Signed and Sealed this

Tenth Day of April, 1990

Attest:

HARRY F. MANBECK, JR.

*Attesting Officer*   *Commissioner of Patents and Trademarks*